United States Patent
Julien

(10) Patent No.: US 6,422,010 B1
(45) Date of Patent: Jul. 23, 2002

(54) MANUFACTURING OF NITINOL PARTS AND FORMS

(75) Inventor: Gerald J. Julien, Puyallup, WA (US)

(73) Assignee: Nitinol Technologies, Inc., Edgewood, WA (US)

( * ) Notice: Subject to any disclaimer, the term of this patent is extended or adjusted under 35 U.S.C. 154(b) by 0 days.

(21) Appl. No.: 09/879,371

(22) Filed: Jun. 11, 2001

Related U.S. Application Data

(60) Provisional application No. 60/265,562, filed on Jan. 31, 2001, and provisional application No. 60/210,902, filed on Jun. 11, 2000.

(51) Int. Cl.[7] .............................................. F01B 29/10
(52) U.S. Cl. .......................................... 60/527; 60/528
(58) Field of Search .................................. 60/527, 528

(56) References Cited

U.S. PATENT DOCUMENTS

| | | | |
|---|---|---|---|
| 3,174,851 A | | 3/1965 | Buehler et al. |
| 5,669,977 A | * | 9/1997 | Shufflebotham et al. .... 118/728 |
| 6,041,600 A | * | 3/2000 | Silverbrook ................. 60/528 |
| 6,067,797 A | * | 5/2000 | Silverbrook ................. 60/528 |

OTHER PUBLICATIONS

Chapter 4 (pp. 23–28) from "55–Nitinol —the Alloy with a Memory: Its Physical Metallurgy, Properties and Applications" by C.M. Jackson, H.J. Wagner and R.J. Wasilewski; National Aeronautics and Space Administration, 1972.

* cited by examiner

*Primary Examiner*—Hoang Nguyen
(74) *Attorney, Agent, or Firm*—J. Michael Neary

(57) ABSTRACT

The invention includes processes and products made by the processes. The processes include making forms and parts by friable mold casting or die casting using molten Nitinol poured or injected into the mold or die. After the Nitinol has cooled to a solid state, it is removed from the mold by disintegrating the friable material of the mold and is heated to an elevated temperature under high pressure to consolidate the Nitinol and remove any internal voids. The parts and forms are then heat treated to reduce brittleness and improve toughness and impact strength. The part may be hot machined to reduce it to near net size, and may be ground to reduce the part to the exact specified part size. For example, cylindrical parts can be centerless ground; balls can be ground in a conventional ball grinder; flat stock can be surface ground. For parts requiring a smooth surface finish, polishing or lapping provides the specified surface finish on the part, down to 0.5 microinch RMS or finer. The part may be heat treated to obtain the desired hardness, from RC40 to RC65. An integral surface oxide of any of several colors can be formed on the surface of the part. The oxide surface may itself be polished to an even finer surface finish. Shape memory effect may be obtained in Type 60 Nitinol parts and forms that have been hot-worked by heat treating to about 675° C.–700° C. and oven cooling slowly over 8–10 hours to ambient temperature.

11 Claims, 7 Drawing Sheets

MANUFACTURING OF NITINOL PARTS AND FORMS

This application claims the benefit of provisional application Ser. Nos. 60/210,902, filed Jun. 11, 2000 and 60/265,562, filed Jan. 31, 2001.

This application relates to U.S. Provisional Application No. 60/210,902 filed Jun. 11, 2000 and U.S. Provisional Application No. 60/265,562 filed Jan. 31, 2001, both entitled "Manufacturing of Nitinol Parts and Forms" by Gerald J. Julien.

This invention pertains to processes for making Nitinol parts and forms, including friable mold casting of Nitinol structures and machining and heat treating processes to give the cast parts the finished shape and size with the desired mechanical properties, and to Nitinol structures produced by these processes, and in particular to methods of making Nitinol structures by investment casting and post-casting operations to achieve desired mechanical properties in the structures.

BACKGROUND OF THE INVENTION

Nitinol is a nickel-titanium intermetallic compound invented at the Naval Ordinance Laboratory in the early 1960's. It is a material with useful properties, but manufacturers who have worked with it have had little success in making Nitinol parts and semi-finished forms. Because Nitinol is so extremely difficult to form and machine, workers in the metal products arts usually abandoned the effort to make products out of anything except drawn wire because the time and costs involved did not warrant the paltry results they were able to obtain.

Nitinol, particularly Type 60 Nitinol (60% Nickel and 40% Titanium by weight), has many properties that are unrecognized as of potential value. It can be polished to an extremely smooth finish, less than 1 microinch rms. It is naturally hard and can be heat treated to a hardness on the order of 62Rc or higher. It can be processed to have a very hard integral ceramic surface that can itself be polished to an even smoother surface than the parent metal. It is non-magnetic, immune to corrosion from most common corrosive agents, and has high yield strength and toughness, even at elevated temperatures. It is 26% lower density than steel for weight sensitive applications such as aircraft, satellites and spacecraft. However, there has hitherto been little effort in making useful parts out to Nitinol because it is so difficult to work, because it was known to be brittle, and because there has been no known method to make parts and forms out of Type 60 Nitinol.

SUMMARY OF THE INVENTION

Accordingly, this invention provides several processes for making Nitinol parts and forms to net and near net size, and for producing the desired mechanical properties of hardness, toughness, and elasticity and shape memory effect in those parts and forms.

The invention includes processes for manufacturing Nitinol products, and the Nitinol products made by the processes. The processes include making forms and parts by friable mold casting or die casting using molten Nitinol poured or injected into the mold or die. After the Nitinol has cooled to a solid state, it is ejected from the die or removed from the mold by disintegrating the friable material of the mold and is heated to an elevated temperature under high pressure to consolidate the Nitinol and remove any internal voids.

Parts and forms made from rolled or cast Nitinol may be heat treated to reduce brittleness and improve toughness and impact strength, and give the parts and forms made of Type 60 Nitinol a highly elastic property which I am calling "ultraelasticity".

The part may be hot machined to reduce it to near net size, and may be ground to reduce the part to the exact specified part size. For example, cylindrical parts can be centerless ground; balls can be ground in a conventional ball grinder; flat stock can be surface ground. For parts requiring a smooth surface finish, polishing or lapping provides the specified surface finish on the part, down to 0.5 microinch RMS or finer. The part may be heat treated to obtain the desired hardness, from RC40 to RC65.

An integral surface oxide of any of several colors can be formed on the surface of the part. The oxide surface may itself be polished to an even finer surface finish. These process elements may all be used to produce a particular part that requires the characteristics provided by each process element, and they may be used in combinations that omit particular process elements or substitute others to give the desired characteristics of the part.

Shape memory effect in Type 60 Nitinol, never before known to exist, may be obtained by heat treating to about 675° C.–700° C. and then cooling slowly over 8–10 hours in the oven.

DESCRIPTION OF THE DRAWINGS

The invention and its many attendant benefits and advantages will become better understood upon reading the following detailed description of the preferred embodiments in conjunction with the following drawings, wherein.

DETAILED DESCRIPTION OF THE PREFERRED EMBODIMENTS

Figure 1:
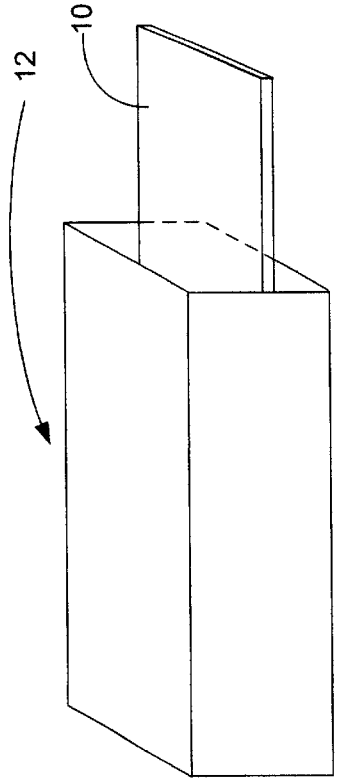
FIGS. 1–3 are schematic diagrams illustrating portions of the process for producing ultraelastic Type 60 Nitinol in accordance with this invention.

"Nitinol Forms" as used herein are semi-finished shapes such as rods, plates, bars, rings and tubes. "Nitinol parts" as used herein are parts made from Nitinol forms or from cast Nitinol parts made in accordance with this invention.

Nitinol is a family of intermetallic materials containing nickel and titanium. Nitinol was invented at the U.S. Naval Ordnance Laboratory in White Oak, Md. and was named to indicate its composition and origin of development: Nickel Titanium Naval Ordnance Laboratory. The best known Nitinol composition is Type 55 Nitinol, containing a nearly equal atomic mixture of nickel and titanium, which is about 55% by weight nickel and about 45% by weight titanium. Other elements, including iron, and copper are sometimes added to modify the material properties, such as transition temperature.

Another lesser known and understood intermetallic compound of Nitinol, Type 60 Nitinol, has a composition of about 60 weight % nickel and about 40 weight % titanium. This material has properties of hardness and strength that significantly exceed those of Type 55 Nitinol, but has not been accepted commercially because it was thought to be too difficult to work and machine, and was thought to have properties that made it undesirable as a structural material, namely, brittleness, notch sensitivity, and an unpredictable tendency to explode when cooling after heating and during forging.

The properties of Type 55 Nitinol materials for consumer and medical applications are known and many applications have been developed for these materials. Two unique characteristics which Type 55 Nitinol exhibits are denoted by the terms "Shape Memory" and "Superelasticity".

Shape memory effect describes the process of restoring the original shape of a plastically deformed sample by heating it to a temperature above the transition temperature, resulting in a crystalline phase change known as "thermoelastic martensitic transformation". Below the transition temperature, Type 55 Nitinol has a soft martensitic microstructure characterized by "self-accomodating twins", a zig-zag like arrangement. Martensite is easily deformed by de-twinning. Heating the material above the transition temperature converts the material to its high strength, austenitic condition. The transformation from austenite to martensite (cooling) and the reverse cycle from martensite to austenite (heating) does not occur at the same temperature. There is a hysteresis curve for every Nitinol alloy that defines the complete transformation cycle. The shape memory effect is repeatable and can typically result in up to 8% strain recovery.

Martensite in Nitinol can be stress induced if stress is applied in the temperature range above Af(austenite final temperature). Less energy is needed to stress-induce and deform martensite than to deform the austenite by conventional mechanisms. Up to 8% strain can be typically accommodated by this process. Since austenite is the stable phase at this temperature under no-load conditions, the material springs back to its original shape when the stress is removed. This extraordinary elasticity is called "pseudoelasticity" or transformational "superelasticity". The typical curve of a properly processed Nitinol alloy shows the loading and unloading plateaus, recoverable strain available, and the dependence of the loading plateau on the ambient temperature. The loading plateau increases with the ambient temperature. As the material warms above the austenite final temperature, the distinctive superelastic "flag" curve is evident. Upon cooling, the material displays less elasticity and more deformation until it is cooled to where it is fully martensite; hence, exhibiting the shape memory property and recovering its deformation upon heating. However, Type 55 Nitinol alloys are superelastic in a temperature range of approximately only 50 degrees above the austenite final temperature. Alloy composition, material processing, and ambient temperature greatly effect the superelastic properties of the material. For the medical device community, binary Nitinol alloys, when processed correctly, are at their optimal superelastic behavior at body temperature, but for typical industrial and military applications, the small temperature range of superelasticity of Type 55 Nitinol can be a serious limitation because they often can be expected to operate at temperatures outside that range.

Nitinol alloys contain more nickel than stainless steels, causing some understandable concern because nickel is considered toxic. However, Nitinol is an intermetallic compound and not an alloy in the metallurgical sense, so the bonding force of nickel to titanium is much stronger in Nitinol than to the alloy components in stainless steel. Nitinol is chemically more stable and less corrosive than stainless steel. In Europe and Asia, Nitinol devices have been implanted in humans since the early 1980's, with vascular and non-vascular stents since the early 1990's. In the USA, several Nitinol devices have received FDA approval during the past few years.

Superelastic Nitinol is a known composition, very nearly the same as 55 Nitinol, but is cold worked to give it remarkable elastic properties. Although providing somewhat less damping capacity than the 55 Nitinol, superelastic Nitinol also has good damping capacity. The combination of extreme elasticity (technically known as "pseudoelasticity") and damping capacity may make superelastic Nitinol a better material in some applications. Nitinol in its Martensitic state has very high damping capacity, on the order of 40% of input strain energy. Superelastic Nitinol also has a high damping capacity after it reaches its pseudoelastic range, but it requires a degree of strain before it becomes a good damping material.

Ultraelasticity

The interesting properties of pseudoelasticity and shape memory have not been thought to exist in Type 60 Nitinol. Indeed, Type 60 Nitinol has been thought to have no significant elastic properties at all. It has been thought to be too brittle and notch-sensitive to serve as an engineering or structural material. However, I have discovered that Type 60 Nitinol can be processed to a state at which it exhibits significant elasticity, which I am calling "ultraelasticity" to distinguish it from "superelasticity" of Type 55 Nitinol. The metallurgical mechanisms that produce ultraelasticity are not fully understood at this time, but the elastic properties of Type 60 Nitinol, properly processed in accordance with this invention, are readily demonstrated in standard objective tests on sample coupons, and also in practical application of the material in applications previously possible only with superelastic Type 55 Nitinol.

The properties of ultraelastic Type 60 Nitinol are as follows:

Elastic range: up to about 6%–7% strain.

Temperature range in which ultraelasticity is exhibited: −150° C. to at least about 600° C. and maybe as high as 750° C.

Ultraelastic Type 60 Nitinol also has the following useful properties: hardness that is adjustable from about 22RC up to about 64RC, low density, high strength (at higher hardness heat treats), low modulus, takes a fine surface finish, low CTE, low thermal conductivity, corrosion resistant, and non-magnetic. At low hardness (22RC–35RC), it has very low yield strength (15KSI–55KSI) and little elasticity, that is, it can easily be plastically deformed with little springback, and is very malleable, that is, can be extensively deformed or strained without cracking.

The processes for producing ultraelasticity in a Type 60 Nitinol semi-finished form or workpiece include melting Type 60 Nitinol by conventional methods in a vacuum furnace. The type of furnace is not critical but is preferably melted in a draw-down graphite crucible for casting into a billet or ingot 10 of a size that is suitable for hot working. I prefer to use small ingots about 4"–5" square or in cylindrical diameter and about 2" long" for convenience to casting operations which often are limited to ingots of that size. Moreover, I believe a smaller grain size is obtained in the smaller ingots. Alternatively, a larger ingot can be cut or forged into a size that is suitable for hot working, although larger ingots have not worked well for me in this process. The exact reason for this difference is not entirely clear to me, perhaps because the grain size in a larger ingot tends to be larger than the grain size in a smaller ingot. Smaller "ingots" intended for rolling can also be cast such as plates 1"–2" thick, 30" wide (or whatever the width of the rolling mill is) and 1'–2' long.

Figure 2:
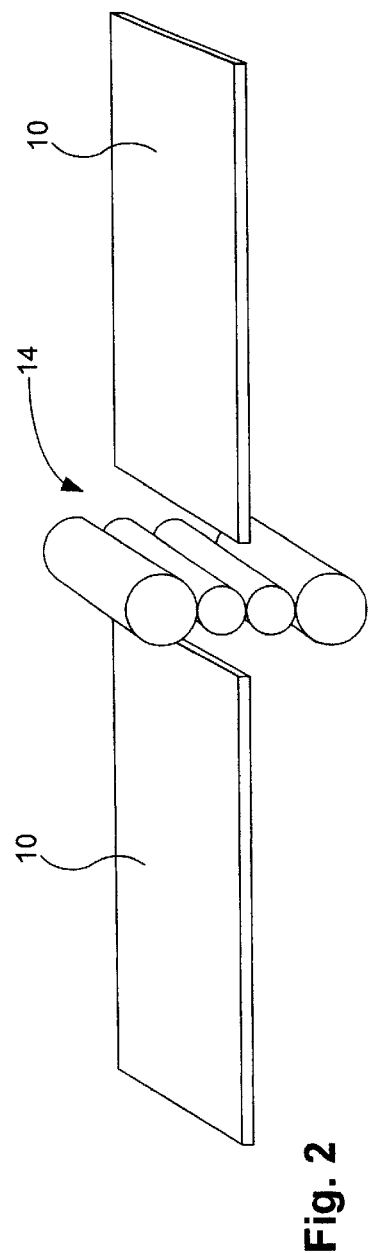
Figure 3:
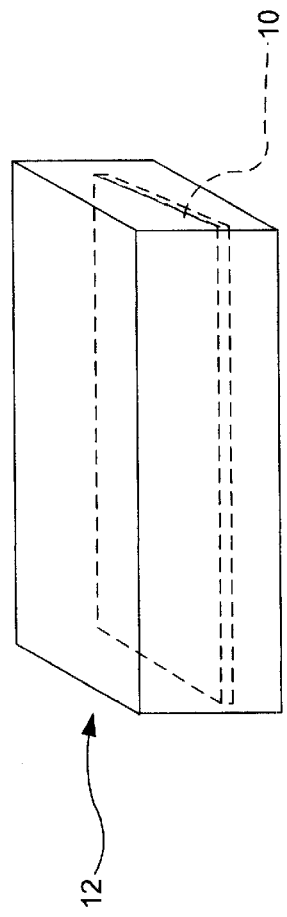

As illustrated in FIGS. 1–3, the ingot 10 or workpiece is heated in a heater 12, such as an oven or furnace or the like, to a working temperature of about 900° C.–950° C. The ingot 10 or workpiece should be held at the working temperature for long enough for the heat to penetrate entirely to its core and for a soak period at that temperature. I have found that a heating period of at least one hour at that temperature is usually enough for plate of ½–¾" thick. The heated plate 10 or workpiece is removed and subjected to hot working in a hot working apparatus 14 by rolling, forging or the like to reduce its dimension toward the desired thickness and length. "Hot-working" is defined as straining the workpiece by about 20%, more or less, while holding it at the working temperature. Examples of hot-working include forging, rolling, hot extrusion, and machining. Another "hot working" method is to subject the cast part to isostatic pressure at elevated temperature for several hours.

Preferably, the tools and/or tooling used in the hot-working are insulated or insulating so that their contact with the hot workpiece does not quench its surface region below the working temperature. Pack rolling the Nitinol plate 10 between heated steel sheets is one effective technique to reduce the quenching effect. Tools and tooling made of Type 60 Nitinol are preferred because it is very hard and strong, even at elevated temperatures, and because the low thermal conductivity of Type 60 Nitinol reduces the rate of heat flux out of the workpiece.

It is best to ensure that the temperature of the ingot 10 or workpiece be maintained above about 900° C. while it is being worked because it loses malleability, so cracks could be initiated in the ingot or plate 10 by hot working below 900° C. Such cracks could cause flaws in the material and should be prevented or ground out. Moreover, the strain rate of the hot working should be slow because Type 60 Nitinol is a strain rate sensitive material and impact strains have been observed to cause catastrophic shattering of the ingot which could be dangerous for the workers in the vicinity. I have found that I obtain the best results in rolling by limiting the thickness reduction to about 5–15 mils per roller pass, preferably 5–6 mils per roller pass. However, as long as the ingot or plate 10 is maintained at the designated working temperature, greater reductions should be possible.

After the initial hot working, the plate is returned to the furnace and reheated to the working temperature of 900° C.–950° C. for a second pass through the hot working apparatus, such as the rolling mill 14. After a few rolling and reheating iterations, the plate can be heated to a lower working temperature of 800° C.–900° C., and is allowed to soak at that temperature long enough to completely reheat the plate through to the core. The reheated plate is now re-rolled, at the lower working temperature. Rolling at the lower working temperature proceeds smoothly without breaking of cracking the plate 10. I am not sure why the later hot working passes can be done at a lower temperature. It may be that the initial hot working reduces the grain size and/or the reheating reduces the presence of hardening precipitates. Whatever the reason, the later hot working passes are smoother than the earlier ones. Rolling is repeated until the plate is elongated and reduced in thickness the desired amount.

The rolled plate 10 produced by this series of heating and rolling steps is very hard and brittle. To obtain the desired ultraelastic properties, the plate 10 is now returned to the oven 12 as shown in FIG. 3 and heated to about 500° C.–700° C. and held at that temperature for a post-hotwork heat soak period for 15–60 minutes or longer, for example, several hours. At the end of the post-hotwork heat soak period, the plate 10 is removed from the oven 12 and is quenched to reduce its temperature quickly. This post-hotwork heat soak and quench process can be used on rolled plate, extrusions, and other hot-worked parts and forms.

I believe a metallurgical change occurs during the post-hotwork heat soak and quench. Although the precise nature of that change is not yet clear to me, I believe that the hot working or casting produces hardening precipitates and that the hot soak period at 700° C. dissolves or otherwise removes or reduces those precipitates to give the plate its ultraelastic properties.

Figure 4:
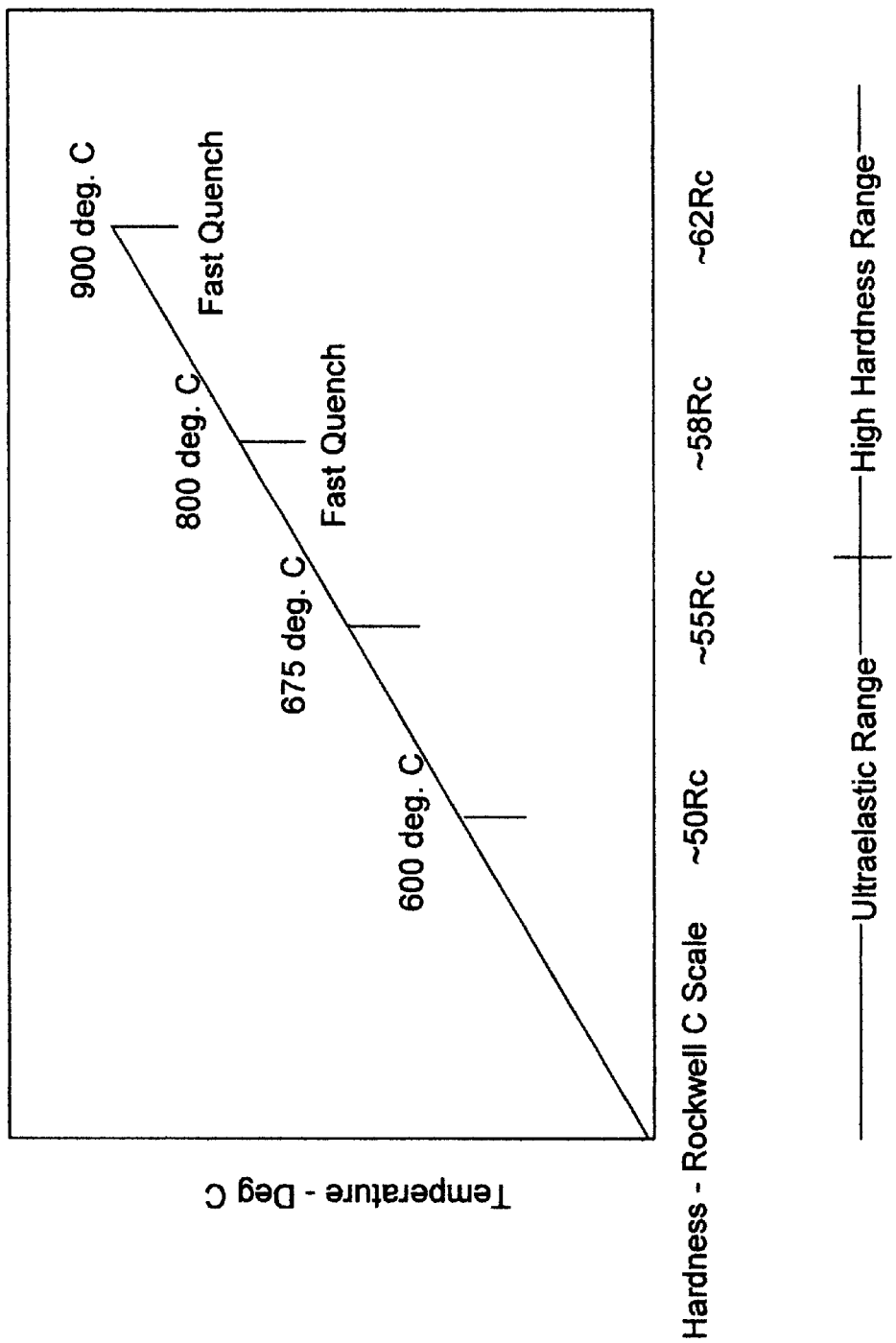
FIG. 4 is a graph of temperatures to which Type 60 Nitinol is heated to obtain ultraelastic elasticity, and some resulting properties.

The ultraelastic Type 60 Nitinol workpiece may be heat treated to a desired combination of hardness and elasticity as illustrated in FIG. 4. For example a hardness of about 58RC–64RC may be obtained by heating it to about 900° C.–950° C. and then quenching in water or other coolant such as oil to cool it quickly to a temperature below about 500° C. The coolant should be agitated or the part moved in the coolant bath to ensure a flow of coolant over the surface of the part to ensure even cooling and prevent development of an insulating steam cushion over portions of the part. As shown in FIG. 4, the harness can be tailored by the temperature of the initial heating. Rapid quenching produces a surface hardness of about 58–64RC at some sacrifice to the elasticity of the material. The strength of the ultraelastic Type 60 Nitinol heat treated to about 50–55 Rockwell C and a strength of about 140,00–155,000 psi and has an elastic strain capability of about 3% up to about 6%.

To retain the ultraelastic properties in a portion of the workpiece but high hardness in other portions such as the cutting edge of a cutting instrument, the portion that need not be hardened can be clamped in a heat sink and the other portion, such as the knife or saw edge, is heated to a hardening temperature of 900° C.–950° C. and then rapidly quenched in water or other coolant. The heat sink prevents the unhardened portion from being heated to the hardening temperature so it retains its ultraelastic properties.

After rapid quenching, the workpiece has a tendency to age harden over a period of several days, producing an increased hardness that may be undesirable. To prevent this age hardening, the workpiece may be heated in boiling water or oven heated to 300° C.–600° C. for several hours and then furnace cooled over several hours or removed and allowed to air cool to room temperature.

Shape Memory Effect

To obtain shape memory effect in Type 60 Nitinol, it is heat treated in accordance with a particular schedule. Starting with a workpiece that has been hot-worked, as by hot rolling Type 60 Nitinol plate or rotary hot swaging cast rods or tubes of Type 60 Nitinol. the hot-worked workpiece is heated in an oven to a temperature between 500° C. and 800° C. and held at that temperature until the temperature has equalized throughout the workpiece. The oven is then turned off and allowed to cool slowly reaching ambient temperature. The cool-down is preferably in the oven, with the doors closed to prevent drafts and uneven or rapid cooling, over a period of 10–12 hours. The workpiece that is removed from the oven has the following properties:

Low hardness: 22RC–28RC

Low yield strength: 50,000 psi

Ultimate tensile strength: 137,000 psi.

High ductility: can be bent and otherwise strained extensively without cracking or rupturing.

Shape memory effect: can be strained to about 5% and returns to the unstrained shape when heated to about 75° F.–180° F., or possibly higher.

Figure 5:
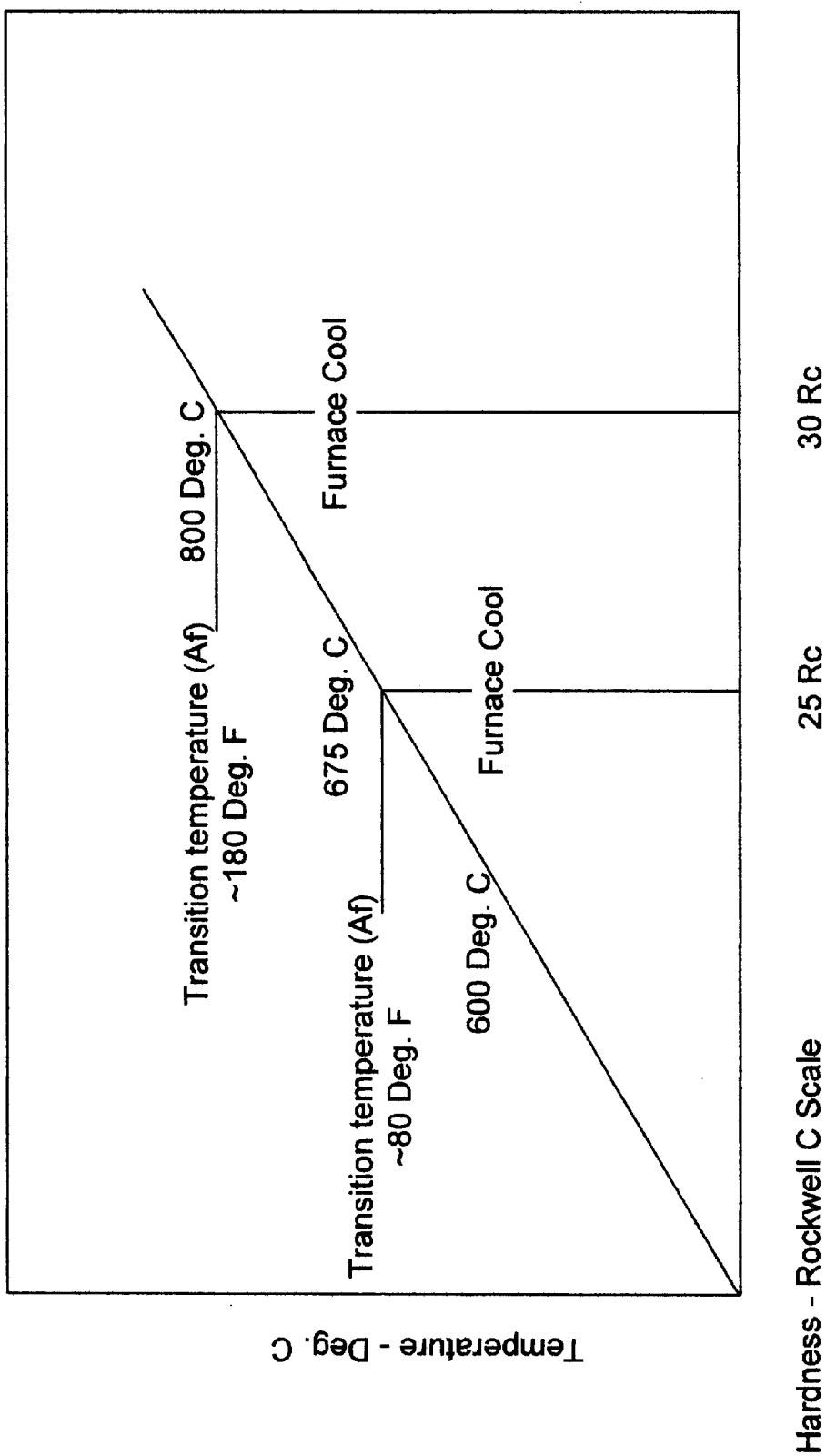
FIG. 5 is a graph of temperatures to which Type 60 Nitinol is heated to obtain shape memory effect properties, and some hardness properties and transition temperatures that result from the process.

The transition temperature can be tailored to the desire temperature within the range noted above by selecting the temperature to which the part is heated before the slow cool-down, as shown in FIG. 5

Type 60 Nitinol having the shape memory effect has many potential uses. A tube of this material can be strained by pulling a ball slightly larger than the bore of the tube through the bore to increase the inner diameter of the tube. The strained tube can then be slid over another tube, such as a gun barrel, and heated to shrink the Type 60 Nitinol sleeve onto the gun barrel. The resulting assembly could then be heat treated to give the Type 60 Nitinol the desired properties of strength.

This method of making gun barrels provides a contraction of the outer portion of the gun barrel and resulting compression of the inner portion around the bore to improve the burst pressure of the gun barrel. This is much simpler than the conventional shrink fitting which is not much used because of the difficulty of assembling hot and cold tubes rapidly enough to nest them completely before they equalize in temperature enough to grow into interference and prevent further nesting. It is also simpler and easier to control than autofrettage, which requires the imposition of stress in the bore sufficient to plastically strain the inner portions of the barrel while straining the outer portions less, within the elastic limit. This is a difficult operation, especially for tapered gunbarrels, and even minute variations in the parameters of the process can result in large variations of the properties.

Shape memory Type 60 Nitinol also has potential use in medical applications, such as stents and orthodontics, as well as self-installing pipe liners and blind fasteners.

Casting

There are two general types of casting that are suitable for making Nitinol forms and parts: friable mold casting and die casting. Friable mold casting involves the use of molds made of high temperature granular material held in a mold shape by sintering or a binder. Aafter casting, the molds are pulverized to extract the part. Die casting uses metal or graphite molds that can be opened or are tapered to allow the part to be pushed out of the mold by ejectors to remove the part. The die casting molds can be reused many times.

One type of friable mold casting that is particularly suitable for casting of Nitinol is investment casting. Investment casting is a highly developed process that is capable of great casting accuracy and can form extremely intricate contours. The process is particularly suitable for Nitinol and Type 60 Nitinol in particular because Nitinol is difficult to machine or otherwise fabricate using conventional processes, and casting is economical in its usage of the material, which is somewhat costly, and for obtaining parts and forms of the quality required. Investment casting is especially applicable in producing either exterior or interior contours of intricate form with surfaces so located that they could not be machined readily, if at all. The process provides efficient, accurate means of producing such parts as balls, roller elements and races for bearings; tools and tooling; knife blanks; nozzle blanks; golf club heads; gun barrels, and many other parts that would benefit from the properties provided by Type 60 Nitinol. In addition, forms made of Type 60 Nitinol can be readily cast and processed for subsequent manufacturing into parts. Such forms include thin plate, bars, rods, tubes and other standard forms that are commonly produced from other materials in large quantities and stocked to sale to parts manufacturers. Depending on the grade of molding or investment material used, the accuracy and finish of investment castings may good enough to either eliminate machining entirely or reduce it to a minimum. The quantity that may be produced economically may range from a few to thousands of duplicate parts.

Investment casting uses an expendable pattern, usually of wax or injection-molded plastics. Several wax replicas or patterns are usually joined together or to bars of wax that are shaped to form runner channels in the mold. Wax shapes that will produce pouring funnels also are fastened to the runner bars. The mold is formed by dipping the wax assembly, known as a "tree", into a thick slurry containing refractory particles. This process is known as investing. After the coating has dried, the process is repeated until a sufficient thickness of material has been built up to form a one-piece mold shell. Because the mold is in one piece, undercuts, apertures, and hollows can be produced easily. This invested shell is baked to increase its strength, and the wax or plastics pattern melts and runs out or evaporates, from which the process derives its name "lost-wax casting". Evacuation of the mold material from the investment leaves a cavity without parting lines for receiving the molten Nitinol.

Some molds are backed up with solid refractory material that is also dried and baked to increase the strength. Filling of the molds from the crucible in which the Nitinol is melted preferably takes place in a chamber filled with inert gas or under vacuum to minimize the oxygen content of the Nitinol in the cast parts. In producing investment castings, it is possible to control the process in various ways to achieve the desired porosity or density of castings, as discussed below.

Duplicate patterns for each casting operation can be made by injecting the wax, plastics, or other pattern material into a master mold or die that usually is made either of carbon steel or of a soft metal alloy. Rubber, alloy steels, and other materials may also be used. The mold cavity commonly is designed to form a cluster of patterns for multiple castings. The mold cavity is not, as a rule, an exact duplicate of the part to be cast because it is necessary to allow for shrinkage and perhaps to compensate for distortion that might affect the accuracy of the cast product. The shrinkage of Nitinol is very small, so only a small shrinkage allowance is needed. For some parts, however, surface grinding or machining is required, so the cast part must be made slightly oversized to accommodate these subsequent operations.

In producing molds for making the dispensable or expendable pattern, several methods may be used. One general method is to form the cavity by machining; another is by pouring a molten alloy around a master pattern that usually is made of monel metal or of a high-temperature stainless steel alloy. If the cavity is not machined, a master pattern is required. Sometimes, a sample of the product itself may be used as a master pattern, when, for example, a slight reduction in size due to shrinkage is not objectionable. The dispensable pattern material, which may consist of waxes, plastics, or a combination of these materials, is injected into the mold by pressure, by gravity, or by the centrifugal method. The mold is made in sections to permit removal of the dispensable pattern. The mold while in use may be kept at the correct temperature by electrical means, by steam heating, or by a water jacket.

Die casting is another casting technique that works well with Nitinol, especially for long hollow parts such as pipes and tubes. In die casting, a split die made of metal or other high temperature material such as graphite is connected through gravity or pressure feed lines to a crucible, preferably tapped from the bottom of the crucible to avoid contamination by undesirable material floating on the top surface of the molten metal in the crucible. A center cavity such as a pipe bore can be provided by a friable core supported at its ends in the split die.

When casting Nitinol, it is important that the gates and dendritic arms (if any) be maintained hot or made large enough to avoid premature hardening of the molten Nitinol in the gates and arms so that solidification shrinkage can be compensated by material drawn through the risers and does not cause cracks, porosity or voids in the cast part. The use of large gates, risers and dendritic arms uses more material and makes the removal of the associated connections from the part a bit more laborious, but it ensures that the cast part will be free of defects. The material in the risers and arms can be recovered for later remelting if the casting is done in a vacuum or inert gas atmosphere to prevent oxygen contamination of the cast part.

Machining

Machining the Type 60 Nitinol can be done in a temperature range from about 400° C.–500° C. to about 950° C., but there is a narrow temperature band that should be avoided. Just below 800° C., the material becomes very hard and is dangerous to machine because it breaks the cutting tools and produces high velocity hot fragments that are a threat to workers and equipment in the vicinity.

An Apparatus

Ultraelastic Nitinol can be used in mechanisms requiring an energy storage element capable of a high degree of elastic strain over a very wide temperature range. There are numerous mechanisms utilizing such elastic element, usually acting in tension, torsion, compression, flexion or a combination thereof. A representative mechanism is an improvement on the rotary actuator mechanism shown in U.S. Pat. No. 6,065,934 issued on May 23, 2000 entitled "Shape Memory Rotary Actuator", the disclosure of which is incorporated herein by reference. This mechanism is a rotary actuator 18 shown in FIGS. 6 and 7 that applies a torsion force to the tip of a helicopter or tilt-rotor blade 16 to improve the aerodynamics of the blade when changing from cruise to hover to increase the hover payload weight.

One embodiment of the improved mechanism is to replace the Type 55 superelastic Nitinol axial rod in the SMA torque tube with an ultraelastic Type 60 Nitinol rod or tube. This modification alone would constitute a significant improvement because the ultraelasticity of ultraelastic Type 60 Nitinol is not temperature sensitive, unlike superelastic Type 55 Nitinol used in the embodiment disclosed in the aforementioned patent. Superelastic Type 55 Nitinol loses its superelastic properties (pseudoelasticity) outside of a fairly narrow temperature range of about 50° C. The axial position of the superelastic rod buried in the center of the tubular actuator and the housing in the embodiment of the '414 application makes it difficult to avoid exceeding the maximum temperature of that temperature range, especially since it is surrounded by a heater element used to heat the rotary actuator tube to its transition temperature. Since the ultraelastic properties of ultraelastic Type 60 Nitinol are not temperature sensitive, it continues to function as a spring with a very high strain capability irrespective of the temperature, within all temperatures that a helicopter or tilt rotor craft would experience.

Figure 6:
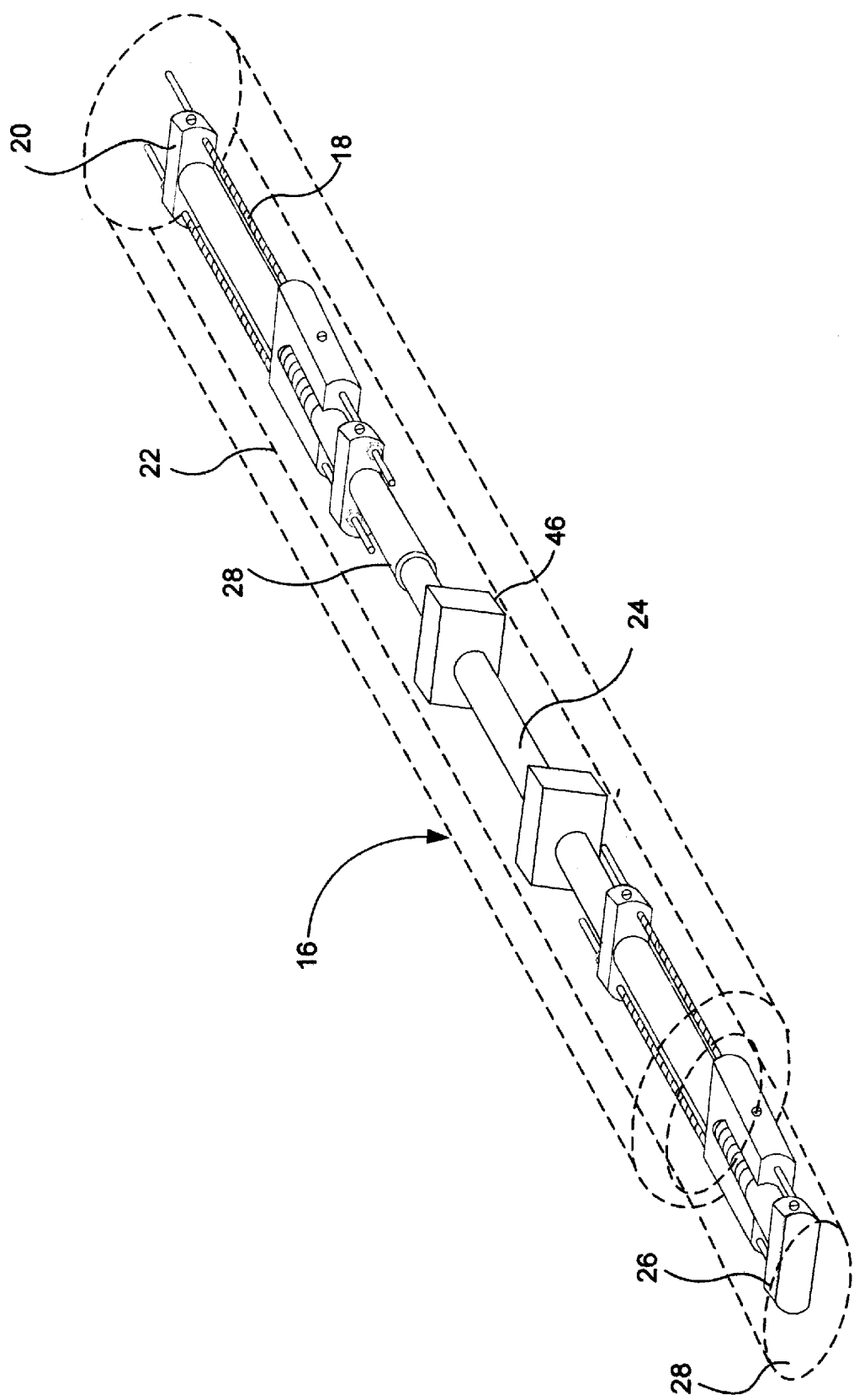
FIG. 6 is a perspective view of a rotary actuator in accordance with this invention in a helicopter blade.
Figures 8, 9:
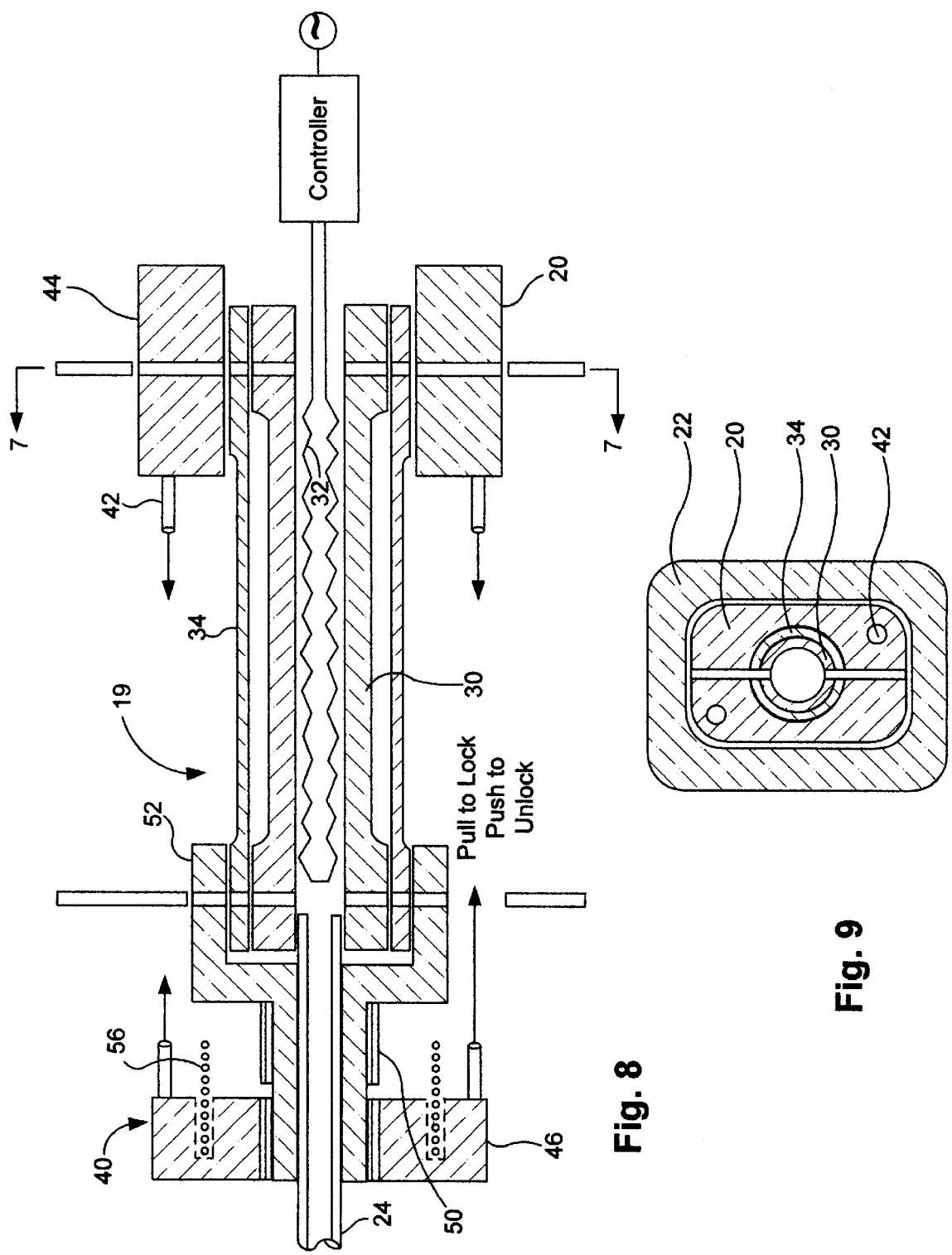
FIG. 8 is a sectional elevation of another embodiment of a rotary actuator in accordance with this invention.
FIG. 9 is a sectional elevation along lines 7—7 in FIG. 8.

A preferred embodiment of the improved rotary actuator mechanism is shown at 19 in FIG. 8. One end of the rotary actuator 19 is connected to a base 20, which in the embodiment of FIG. 6 is torsionally coupled to the root of a spar 22 of the helicopter or tilt-rotor blade. The other end of the actuator 19 is connected to one end of a structure to be rotated. In the embodiment in FIG. 6, the structure to be rotated is a torque tube 24 that is coupled at its other or distal end to a connector 26 at the tip 28 of the helicopter or tilt-rotor blade 16. Actuation of the actuator 18 rotates the torque tube 24 to twist the tip of the blade 16 to give the blade 16 the desired twist configuration.

The actuator 19, shown in detail in FIG. 8, includes a tubular actuator 30 made of Type 55 Nitinol having a high transition temperature so that it is normally in its martensitic state. The actuator 19 may also be made of a cast tube of Type 60 Nitinol that is rotary swaged at about 900° C. and then heat treated to low hardness for machining to final dimensions before a final heat treat to product the shape memory effect as described above. An electric heater element 32 is fitted inside the bore of the tubular actuator 30 to heat it to a temperature above its transition temperature and provide the torque to twist the blade tip to the desired twist angle, as explained in more detail below. The tubular actuator 30 is mounted coaxially in the bore of a tubular ultraelastic 60 Nitinol return spring 34 which provides a return torque to rotate the tubular actuator 30 back to its original angular configuration.

The tubular actuator 30 is twisted about its axis by about 40°–90° while in its martensitic state and is pinned at its ends to the ends of the ultraelastic tubular return spring as shown in FIG. 8. The relative dimensions of the tubular actuator 30 and the ultraelastic tubular return spring 34 are selected so that the recovery strength of the tubular actuator 30 while in its martensitic state is weaker than the ultraelastic tubular return spring 34, but the recovery strength of the tubular actuator 30 when transitioning to its austenitic state (that is, after being heated to a temperature above its transition temperature) is stronger than the ultraelastic tubular return spring 34. In this way, the condition of the pinned assembly of the tubular actuator 30 and the ultraelastic tubular return spring 34 at normal operating temperature is at the zero/untwisted or cruise configuration of the ultraelastic tubular return spring 34 and at the fully twisted configuration of the tubular actuator 30. When the helicopter is transitioning to hover mode, the heater 32 is energized to heat the tubular actuator 30 to its transition temperature, whereupon the tubular actuator 30 spontaneously restores to its untwisted configuration, twisting the ultraelastic tubular return spring 34 and the torque tube 24 to twist the blade 16 to its optimal hover configuration.

Figure 7:
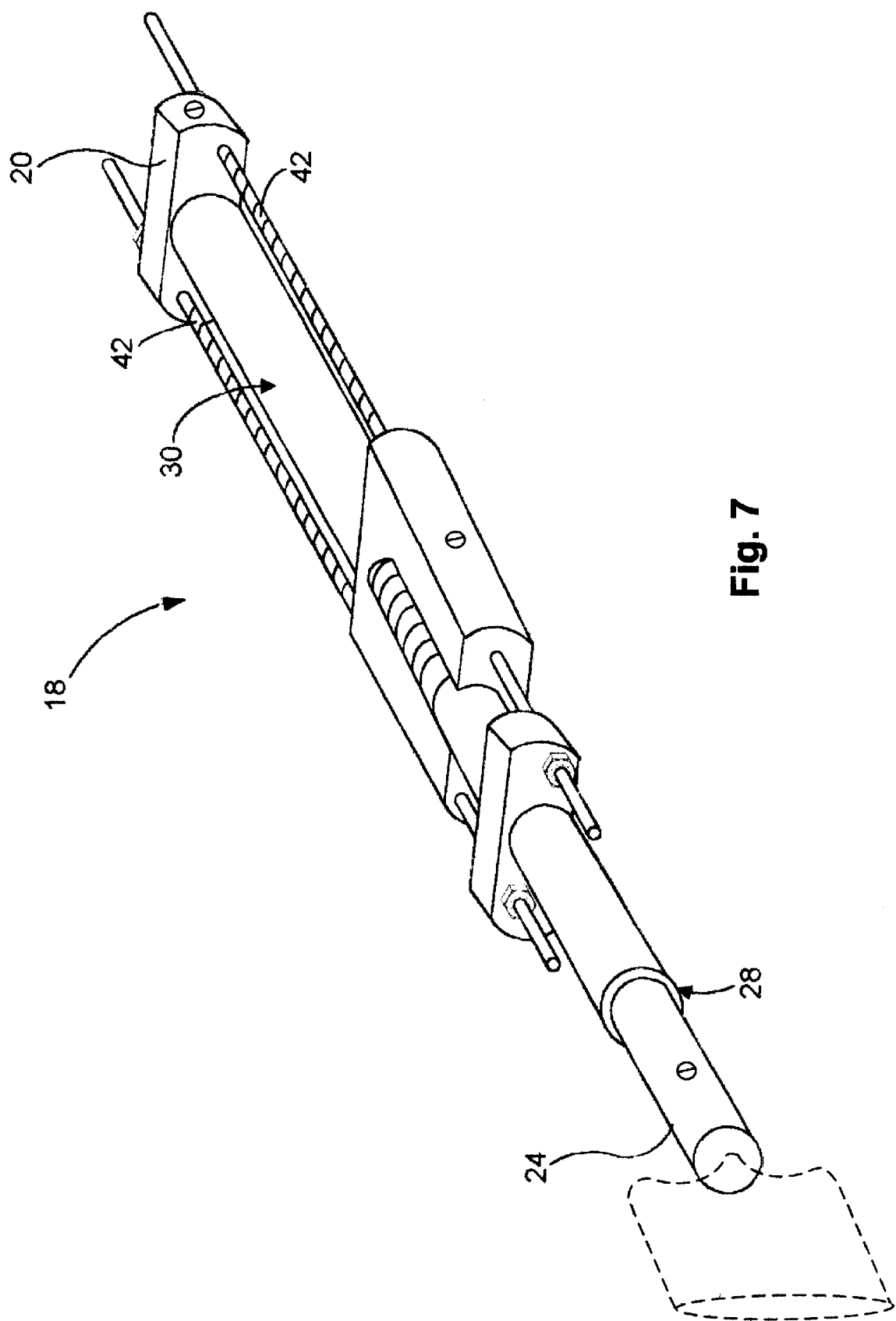
FIG. 7 is a perspective view of the rotary actuator shown in FIG. 4.
Figure 10:
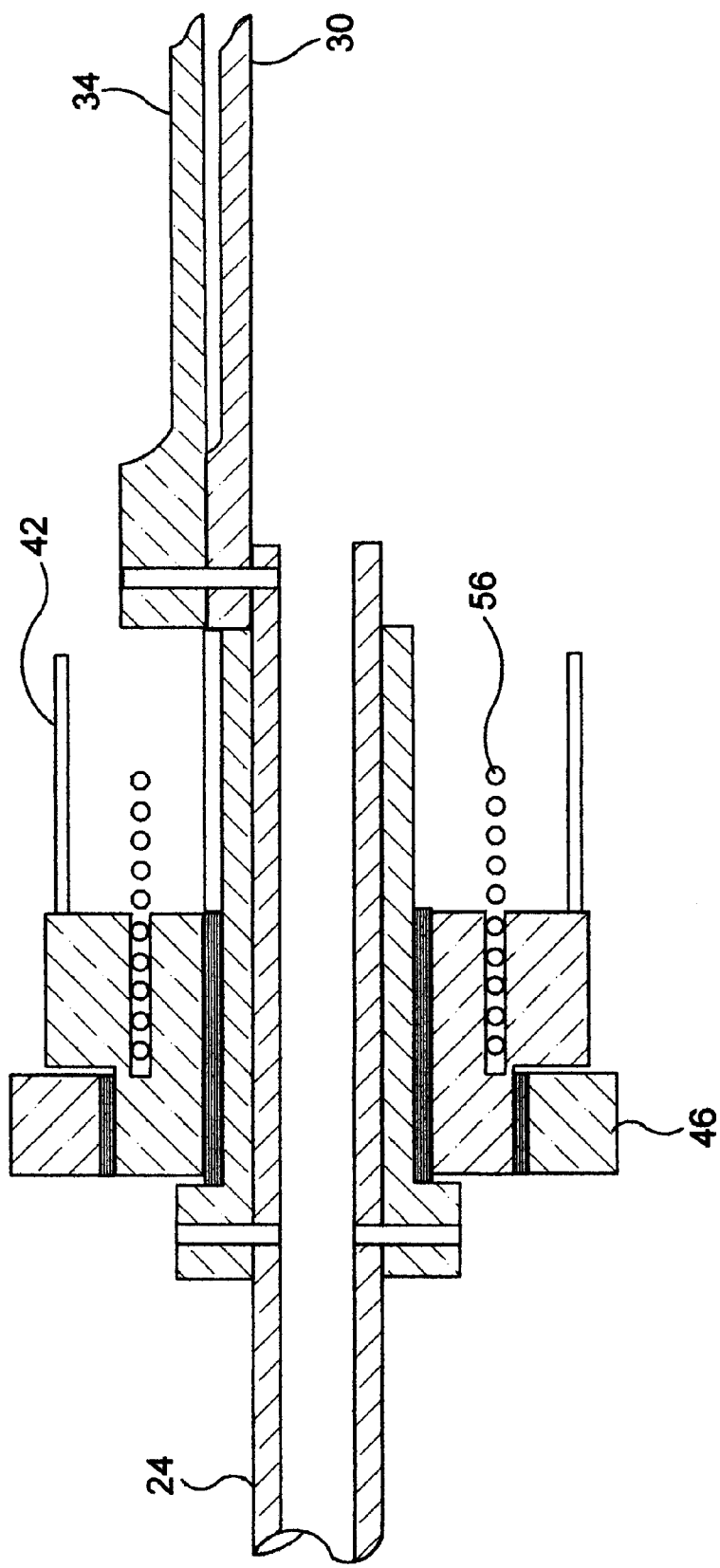
FIG. 10 is a sectional elevation of another embodiment of a lock mechanism for use in the embodiment of FIG. 6.

A rotation lock 40 is provided to lock the torque tube 34 at a desired twist angle so that the electric heater 32 in the tubular actuator 30 need not be continuously energized to maintain the tubular actuator 30 in its austenitic state. Two embodiments of rotation locks are shown in FIGS. 8 and 10. In the first embodiment shown in FIG. 8, two Type 55 martensitic rods 42 are connected between two rounded rectangular coupling blocks 44 and 46 that fit into the rounded rectangular core of the spar 22, as shown in FIG. 7. Energizing the heater wire surrounding the rods 34 heats them to their transition temperture and pulls the coupling block 46 into engagement with the splines 50 on a connector 52 pinned to the end of the rotary actuator tube and the ultraelastic Type 60 Nitinol return spring 34 to lock the torque tube 24 in its twisted configuration to hold the tip of the blade 16 in its twisted configuration. An ultraelastic Type 60 coil compression spring 56 or stack of ultraelastic Belleville washers biases the coupling block toward its unlocked position.

The lock shown in FIG. 10 is similar but is biased toward its locked position so the heater element on the rods 42 are actuated to unlock the actuator when it is desired to change its angular tilt position.

Making the Ultraelastic Torsion Tube

The Ultraelastic torsion tube 34 is made by either of the following processes:

A) A casting process:
1. Casting to produce a tube blank.
2. Hot-working the cast tube blank on a mandrel in a rotary forging apparatus at between 900° C. and 950° C. to produce a reduction in wall thickness of more than 2%, and preferably more than 25%.
3. Machining to the desired tube wall thickness and length.
4. Reheat to between about 675° C. and 800° C., then water quench to produce the ultraelastic properties.

B) A welding process:
1. Rolling a plate of Type 60 Nitinol to the desired thickness of the tube wall.
2. Heat treating the plate to between 500° C. and 800° C. and allowing the plate to cool gradually over a period of about 8–12 hours to room temperature. The plate heat treated in this manner will have a low tensile strength but will be very malleable.
3. Forming the malleable plate around a mandrel and clamping the plate on the mandrel to hold it in the shape of the mandrel (typically a cylindrical shape, but could be oval, rectangular or other such shapes.)
4. Reheating the plate, still clamped around the mandrel, to about 900° C. and cooling the part, now formed into a tubular shape. The part can be quenched to give it the ultraelastic properties, or it can be slow oven-cooled gradually over 8–12 hours to give it shape memory effect properties.
5. Removing the mandrel and butt welding the abutting edges on the tube form to produce a seam-welded tube. Welding can be accomplished by tungsten inert gas (TIG) welding using Type 60 Nitinol filler rod, or welded by plasma, E-beam or laser processes.
6. After welding, the tube is reinserted in the oven and again heat treated to ensure that the weld joint has the same properties as the rest of the tube material.

Making the Ultraelastic Lock Bias Spring

The bias spring 56 can be made in several ways:
1. Cutting a helical slot in an ultraelastic Type 60 Nitinol tube. Laser and abrasive water jet cutting both work well for cutting Nitinol. Machining is also feasible, particularly if the tube has been teat treated to low hardness as described above.
2. Winding an ultraelastic Type 60 Nitinol laser-cut bar onto a mandrel and heating to 900° C.–950° C. and quenching to give desired hardness and yield strength.
3. Laser cutting discs from hot-rolled sheet of ultraelastic Type 60 Nitinol material of the thickness to give the stiffness needed, and pressing into concave shape at 900° C.–950° C. to form Belleville washer elements, then quenching to give desired hardness and yield strength. The Belleville washer is made of a stack of pairs of washer elements placed with their concave surfaces facing each other, and held with a central rod in a stack as long as necessary to give the desired travel and stiffness.
4. One or more short tubes of ultraelastic Type 60 Nitinol can be used in place of the stack of Belleville washers, in a stack with their axes perpendicular to the axis of the stack. Like the Belleville spring stack, a rod holds the stack together.

Obviously, numerous modifications and variations of the preferred embodiment described above are possible and will become apparent to those skilled in the art in light of this specification. For example, the process is useful for producing products not specifically mentioned herein, e.g. cutting instruments such as knives, chipper blades for wood chippers and brush chipper/shredders, razor blades and scalpels. Many other products may be produced, such as bearing races, guides and ways for machine tools and machinery, and gun barrels. Moreover, many functions and advantages are described for the preferred embodiment, but in many uses of the invention, not all of these functions and advantages would be needed. Therefore, I contemplate the use of the invention using fewer than the complete set of noted features, process steps, benefits, functions and advantages. For example, all the process elements may be used to produce a particular part that requires the characteristics provided by each process element, or alternatively, they may be used in combinations that omit particular process elements or substitute others to give the desired characteristics of the part. Moreover, several species and embodiments of the invention are disclosed herein, but not all are specifically claimed, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, in all their combinations, are to be considered within the spirit and scope of the invention as defined in the following claims, Wherein I claim:

1. A process of making parts and forms of Type 60 Nitinol having a shape memory effect, comprising:

selecting a Type 60 Nitinol workpiece that has been hot-worked at a temperature of about 900° C. to 950° C. to a reduction of at least about 2% in the dimension of said hotworking;

heat treating said hot-worked workpiece to produce said desired properties, said heat treating including heating said workpiece to at least about 500° C. to about 800° C. and allowing said workpiece to cool to ambient temperature gradually over a period of 8–12 hours.

2. A process as defined in claim 1, wherein:

said reduction in thickness during said hot-working is at least about 25%.

3. A process as defined in claim 1, wherein:

said workpiece is a tubular form.

4. A process as defined in claim 3, further comprising:

welding abutting edges of said tubular form to make a seam-welded tube.

5. A process as defined in claim 1, wherein:

said workpiece is a cast tube that has been hot worked on a mandrel in a rotary forging apparatus.

6. A process of making parts and forms of Type 60 Nitinol that have an elastic limit of at least 4%, comprising:

selecting a hot worked part made of Type 60 Nitinol;

heating said part a post-hotwork heat soak temperature of about 500° C.–700° C. and holding said part at said temperature for a post-hotwork heat soak period of about 15 minutes or greater after temperature equalization throughout said part; and quenching said part at a fast cooling rate in a coolant to room temperature.

7. A process of storing and recovering energy in mechanical systems, comprising:

selecting a Type 60 Nitinol part that has been subjected to a heating and quenching process to give said part an elastic limit of at least about 3%;

exerting force on one portion of said Type 60 Nitinol part while restraining another portion of said part, thereby creating strain in said part between said one portion and said other portion of said part and storing input mechanical energy;

recovering strain energy by allowing said one portion to restore toward an original unstrained position thereof.

8. A process of storing and recovering energy as defined in claim 7, wherein:

said heating and quenching process includes heating a Type 60 Nitinol part blank to a post-hotwork heat soak temperature of about 500° C.–700° C. and holding said part blank at said temperature for a post-hotwork heat soak period of about 15 minutes or greater after temperature equalization throughout said part blank; and quenching said part blank at a fast cooling rate in a coolant to room temperature.

9. A process of making Type 60 Nitinol parts and forms exhibiting shape memory effect, comprising:

selecting a workpiece made of Type 60 Nitinol that has been hot-worked, as by hot rolling Type 60 Nitinol plate or rotary hot swaging cast rods or tubes of Type 60 Nitinol;

heating said hot-worked workpiece in an oven to a temperature between 675° C.–700° C. and holding said workpiece at that temperature until the temperature has equalized throughout the workpiece;

turning off said oven and allowing said oven and said workpiece therein to cool 8–10 hours until reaching ambient temperature; and;

removing said workpiece from said oven.

10. An apparatus for storing and recovering mechanical energy, comprising:

an elongated element made of ultraelastic Type 60 Nitinol having an elastic limit of greater than 3% and having two ends;

a first member in said apparatus in contact with a first end of said ultraelastic Type 60 Nitinol element;

a second member in said apparatus in contact with a second end of said ultraelastic Type 60 Nitinol element;

said first and second members of said apparatus being mounted for movement relative to each other while in contact with said ultraelastic Type 60 Nitinol element.

11. An apparatus as defined in claim 10, wherein said ultrelastic Type 60 Nitinol element is made using a process including the following steps:

selecting a hot worked part made of Type 60 Nitinol;

heating said part a post-hotwork heat soak temperature of about 500° C.–700° C. and holding said part at said temperature for a post-hotwork heat soak period of about 15 minutes or greater after temperature equalization throughout said part; and quenching said part at a fast cooling rate in a coolant to room temperature.

* * * * *